No. 877,143. PATENTED JAN. 21, 1908.
C. E. TRENT.
CORN HUSKER.
APPLICATION FILED JUNE 24, 1905.
5 SHEETS—SHEET 1.
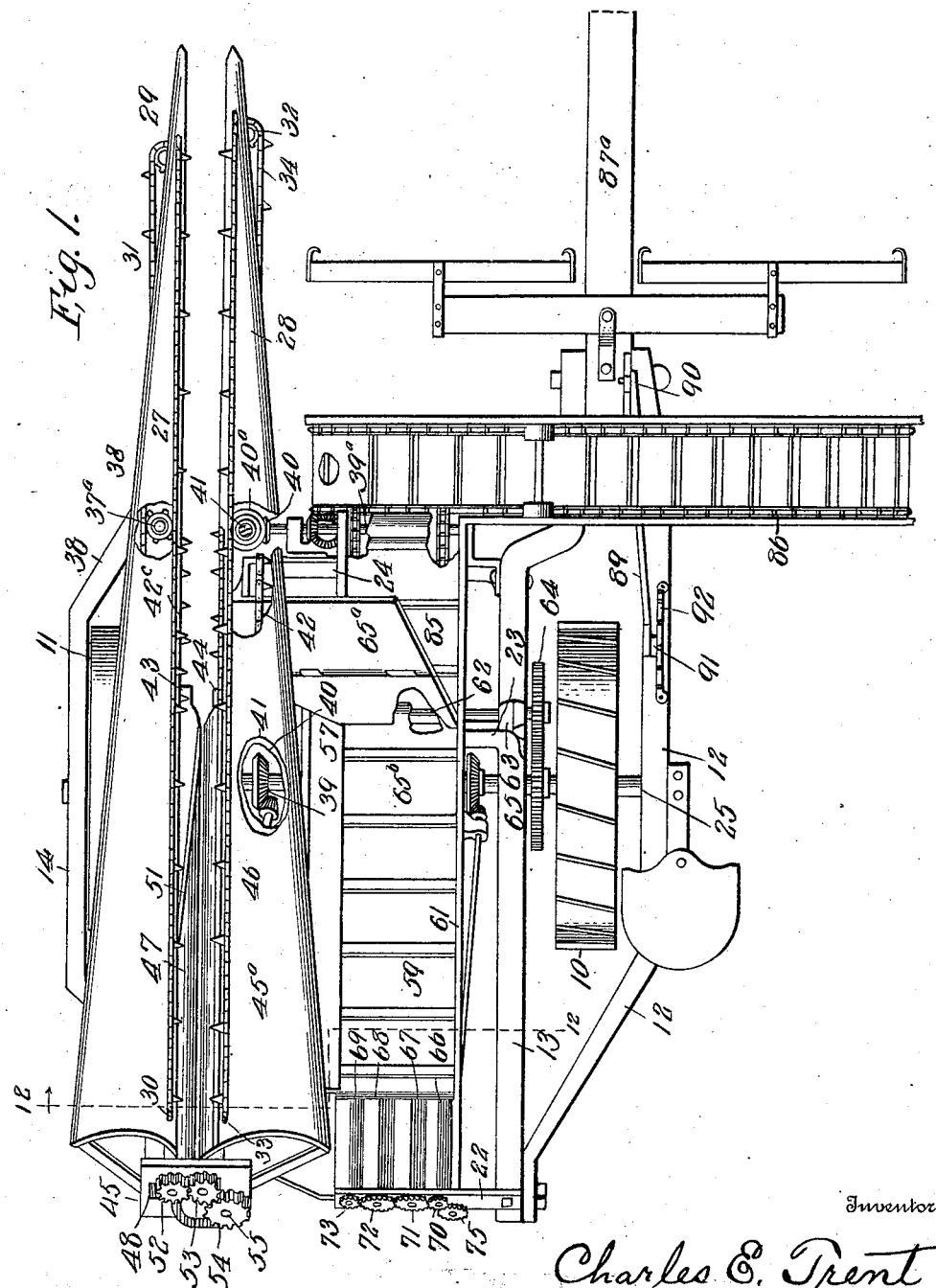
Witnesses
Jos. F. Collins
R. C. Braddock.
Inventor
Charles E. Trent
By Orwig & Lane
his Attorneys

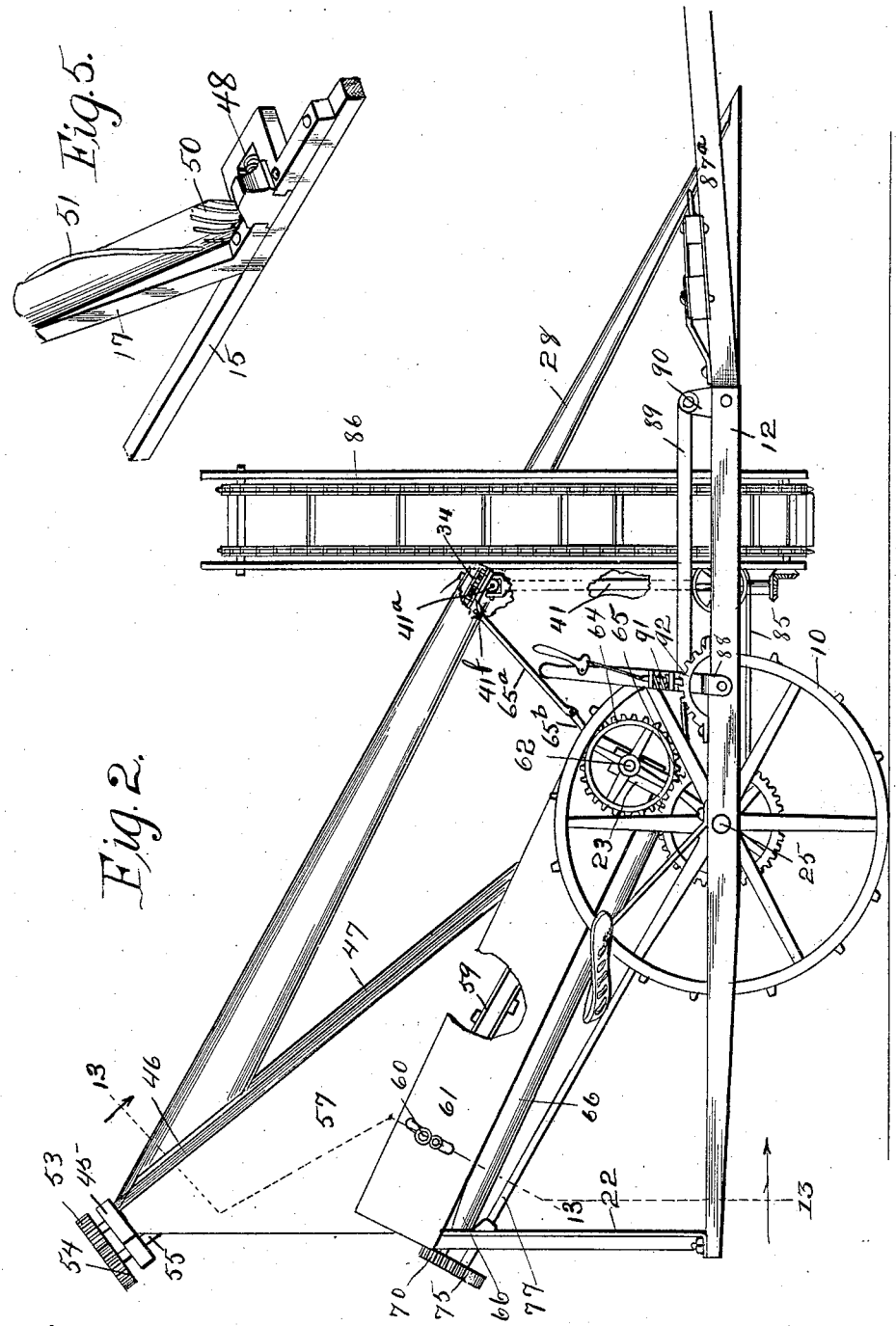

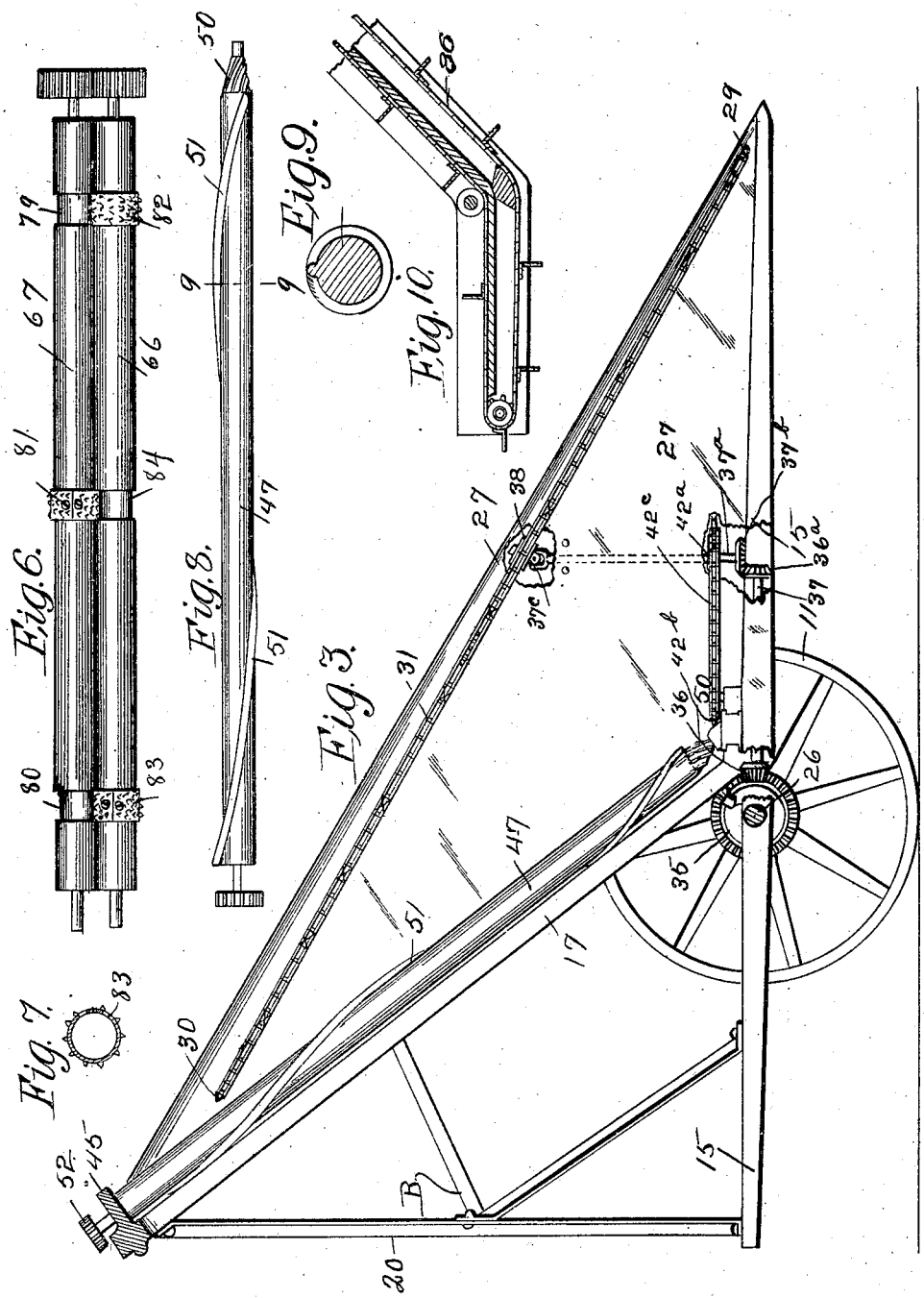

No. 877,143.

PATENTED JAN. 21, 1908.

C. E. TRENT.
CORN HUSKER.
APPLICATION FILED JUNE 24, 1905.

5 SHEETS—SHEET 4.

Witnesses
Jos. F. Collins
R. C. Braddock.

Inventor
Charles E. Trent
By Orwig & Lane
his Attorneys

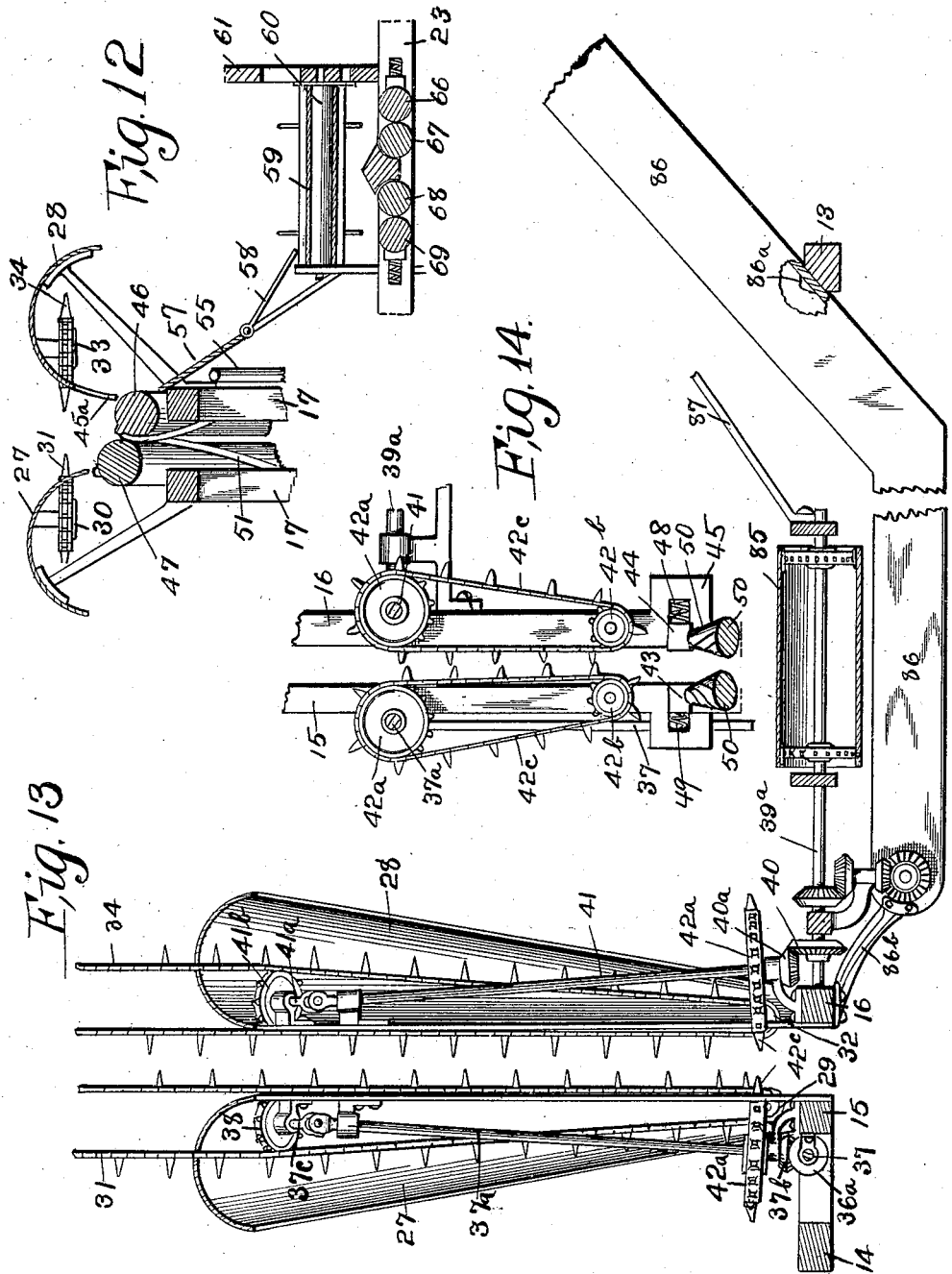

UNITED STATES PATENT OFFICE.

CHARLES E. TRENT, OF REDFIELD, IOWA.

CORN-HUSKER.

No. 877,143.　　　　Specification of Letters Patent.　　　　Patented Jan. 21, 1908.

Application filed June 24, 1905. Serial No. 266,871.

*To all whom it may concern:*

Be it known that I, CHARLES E. TRENT, a citizen of the United States, residing at Redfield, in the county of Dallas and State of Iowa, have invented a certain new and useful Corn-Husker, of which the following is a specification.

The objects of my invention are to provide a device for gathering corn from the field; that is, stripping the ears of corn from the standing stalks, allowing these ears to fall onto an elevating conveyer which carries it to husking rollers where it is husked, and the ears are then allowed to drop onto a conveyer which delivers it onto a side delivery elevating conveyer designed to deliver it into a wagon or other vehicle.

A further object is to provide a device of this class which will be of comparatively light draft and in which the rollers are so arranged and constructed that the ears of corn will be evenly stripped from the stalks and the husking rollers so constructed with detachable bands that these rollers will husk the corn easily and the bands will also be capable of being removed, so as to be replaced by new bands having sharper teeth than the ones taken off, and thus save the necessity of removing the rollers when the teeth on the bands need sharpening.

My invention consists in certain details in the construction, arrangement and combination of the various parts of the device, whereby the objects contemplated are attained, as hereinafter more fully set forth, pointed out in my claims and illustrated in the accompanying drawings, in which—

Figure 11:
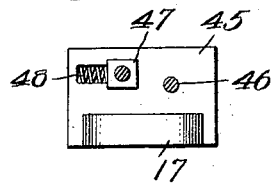
Figure 4:
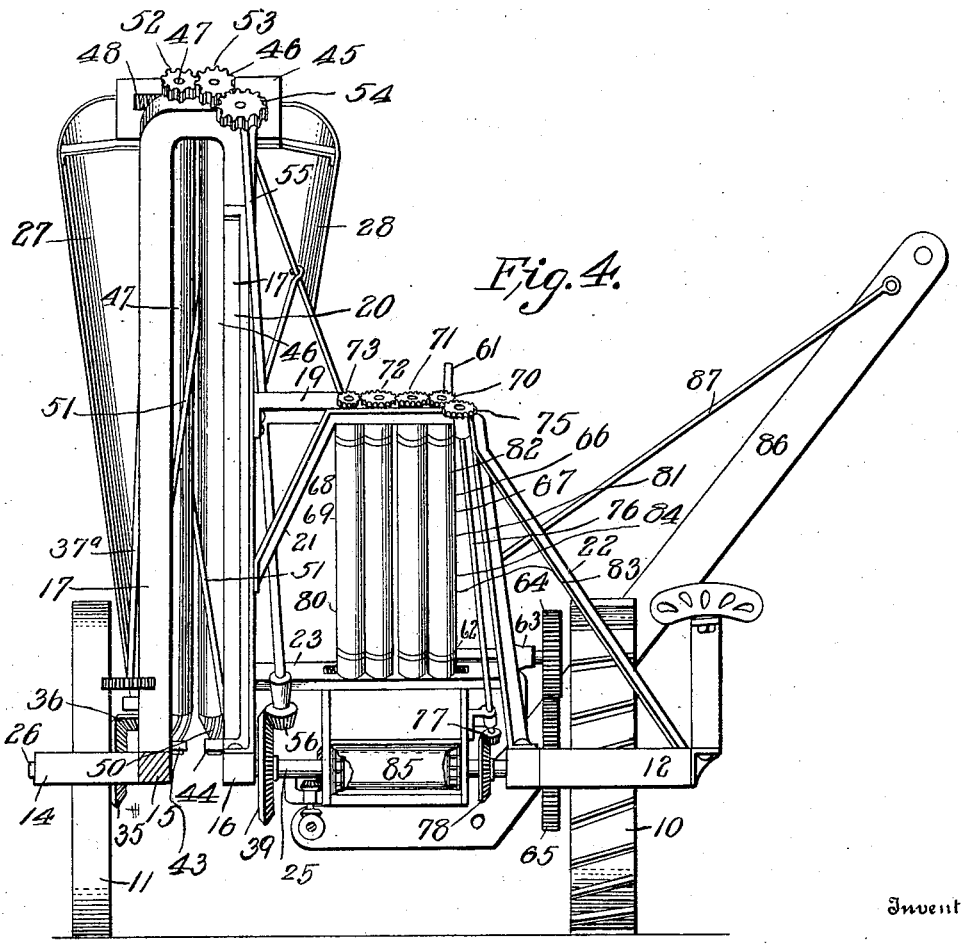

Figure 1 is a plan view of the complete machine. Fig. 2 is a side elevation of the same. Fig. 3 is a longitudinal, sectional view of the device cut between the snapping rollers and looking toward the left of the machine. Fig. 4 is a rear elevation of the device. Fig. 5 is a detail view of the lower end of one of the snapping rollers, showing the way of mounting the same at its lower end. Fig. 6 is a detail plan view of the husking rollers removed from the frame. Fig. 7 is a detail, sectional view of one of the detachable bands detached from the husking rollers. Fig. 8 is a detail view of one of the snapping rollers removed from the frame. Fig. 9 is a sectional view of one of the snapping rollers cut on a line 9—9 of Fig. 8. Fig. 10 is a detail, sectional view of the lower end of the side delivery elevating conveyer. Fig. 11 is a detail view showing the upper portion of the arch between which the stalks pass and the block attached thereto for supporting the snapping rollers. Fig. 12 is a diagrammatic sectional view of the device, showing the positioning of the rollers relative to each other and the connection between the snapping rollers and the husking rollers, the line of section being taken on line 12—12 of Fig. 1. Fig. 13 is a detail, sectional view, cut on the line 13—13 of Fig. 2. Fig. 14 is a detail, plan view of mechanism for feeding the stalk into the snapping rollers.

Referring to the accompanying drawings, I have used the reference numerals 10 and 11 to indicate the traction wheels upon which the device is mounted, these wheels being the ones from which all of the mechanism is driven. These wheels 10 and 11 support the entire mechanism. The frame of the machine comprises the two sills 12 and 13, the sill 12 being arranged on the outside of the sill 13. There are also two sills 14 and 15, the sill 14 being outside of the traction wheel 11 and the sill 15 being on the inside of the traction wheel. A slight distance inside of the sill 15 is a sill 16 which is connected with the sill 15 by means of the arch 17 which is designed to secure these two sills in position relative to each other and at the same time to allow the corn stalks to pass between these sills and beneath the arch 17. The arch 17 is rigidly supported relative to the sill 13 by means of the brace 18, which brace extends upwardly from its point of attachment to the sill 13 and then away from said point of attachment at substantially right angles to the body of it, a supporting brace 3 is also interposed between sill 15 and the arch 17. The right angled extension thereof I have termed for the sake of convenience the roller supporting brace 19. There is a brace 20 which connects the upper portion of the arch 17 with the rear end of the sill 16, so that the rear upper end of the arch 17 is supported rigidly in position relative to this sill 16. The roller supporting brace 19 is connected with the brace 16 by means of an auxiliary brace 21. The brace 18 is additionally supported relative to the sill 13 by means of the brace 22. The arch 17 is also connected with the sill 13 by means of the roller supporting brace 23 which supports the lower end of the husking rollers, to be hereinafter described. The forward end of the arch is also connected with the sill 13 by means of a brace 24. Extending between the sills 12, 13, and 16 and rotatably mounted in these sills is the driving shaft 25 to which the traction wheel 10 is rigidly secured. Rotatably mounted in the sills 14 and 15 is the shaft 26 to which the traction wheel 11 is rigidly secured.

The forward ends of the sills 15 and 16 are pointed and considerably in advance of the traction wheels and they are separated a sufficient distance to receive the stalks forming the rows of corn between them as the machine is advanced over the ground surface. Connected to the forward portion of the sill 15 is a guiding shield 27 which is curved and which is smaller at its forward end and increases in width toward its upper end and is designed to prevent the corn being snapped from the stalks before it reaches the snapping rollers, and then to guide the corn into these snapping rollers as well as to prevent the corn thus snapped from getting into the working parts of the device and to pervent the corn from being delivered any where except to the elevating mechanism, at the right of the snapping rollers.

Secured to the forward end of the sills 16 and to the upper portion of the arch 17 on the opposite side of the snapping rollers from the guide shield is a guiding shield 28 constructed like the guiding shield 27 except that there is an opening $45^a$ provided by cutting away a portion of this shield to the right of the snapping rollers through which the ears of corn are to be fed after they have been snapped by the rollers from the stalk. At the forward end of the shield 27 is a sprocket 29. Rotatably mounted at the upper end of the shield is a sprocket 30. Passing around these sprocket wheels 29 and 30 is a toothed chain 31. Mounted in the lower end of the shield 28 is a sprocket 32. Mounted in the upper end of the shield 28 is a sprocket 33. Passing around the sprocket wheels 32 and 33 is a toothed chain 34. The toothed chains 31 and 34 are between the surfaces of the shields 27 and 28 which are nearest each other during a portion of their movement, and they move in the same direction while between these shields, so as to advance the stalks of corn between these shields to the snapping rollers, and to pick up any stalks which have been bent over as the machine is advanced over the ground surface.

Mounted on the shaft 26 and inside of the traction wheel 11 is a bevel gear 35 which is in mesh with the bevel gear 36, said bevel gear 36 being attached to the lower end of the rotatably mounted shaft 37, which shaft bears the bevel gear $36^a$ at its forward end. Extending at right angles to the shaft 37 is a shaft $37^a$ having a bevel gear $37^b$ in mesh with the bevel gear $36^a$. At the upper end of the shaft $37^a$ is a shaft $37^c$ secured to the shaft $37^a$ by means of a universal joint. Mounted on the shaft $37^c$ is the sprocket wheel 38. This sprocket wheel 38 is designed to drive the toothed chain 31 as the machine is advanced over the ground surface, for as the traction wheel is rotated, the gears 35 and 36 will be rotated to drive the shaft 37 and the sprocket wheel 38.

Mounted on the shaft 25 and adjacent to the inner end thereof is a bevel gear 39. In front of the shaft 25 is a shaft $39^a$ which drives the elevating conveyer, as hereinafter set forth. Mounted at the inner end of this shaft $39^a$ is a bevel gear 40. In mesh with the bevel gear 40 is a bevel gear $40^a$, which bevel gear is secured to the lower end of the shaft 41, said shaft 41 having a shaft $41^a$ secured to its upper end by a universal joint. The shaft $41^a$ has mounted on it the sprocket wheel $41^b$ which drives the toothed chain 34 as the machine is advanced over the ground surface. Mounted on each of the shafts $37^a$ and 41 is a sprocket wheel $42^a$. At the rear of each of the sprocket wheels $42^a$ is a sprocket wheel $42^b$ which are rotatably mounted above the sills 15 and 16. Passing around each pair of sprocket wheels $42^a$ and $42^b$ is a toothed chain $42^c$, which chains are immediately above the sills 15 and 16 and are designed to advance the corn stalks and feed them to the roller as the machine is advanced over the ground surface. Thus as the machine is advanced, both of the chains 31 and 34 are operated and driven in opposite directions to cause the stalks passing between the shields 27 and 28 to be picked up by them and advanced rearwardly between these shields.

Mounted at the lower end of the arch 17 and extending inwardly from the sills 15 and 16 are the boxings 43 and 44 respectively. Attached to and extending forwardly from the upper end of the arch 17 is a boxing 45. Rotatably mounted in the boxings 44 and 45 is the snapping roller 47 designed to coact with the snapping roller 46 in operation. The snapping roller 47 is maintained in position relative to the snapping roller 46 by means of the spring 48 which is mounted in the boxing 45 and by the spring 49 in the boxing 43. On account of the springs being mounted in this way, the roller 47 is capable of being moved toward or away from the roller 46. Each of these rollers has a tapered end having spiral grooves therein. I have designated this lower end by the numeral 50. Throughout the entire length of each of these snapping rollers is a spiral member 51 shown clearly in Fig. 8 of the drawings, and which are designed to assist in snapping the ears from the stalk and in working the stalk between the rollers. At the upper rear end of the roller 47 is a gear 52 which is in mesh with the gear 53 on the upper rear end of the roller 46. This gear 53 is in mesh with a gear 54 which is attached securely to the rotatably mounted shaft 55. This shaft 55 has mounted at its lower end a bevel gear 56 in mesh with the gear 39 which drives it to rotate the snapping rollers in opposite directions, for the purposes above mentioned. At the rear end above the roller 46 an aperture 45ª has been provided in the shield 28 to allow the corn as it is snapped from the stalk to fall upon an inclined plate 57 which is secured at its upper side to the arch and at its lower side to the supporting brace 19 and the roller supporting brace 23. Pivotally attached to the central portion of the inclined plate 57 and extending longitudinally of it is a plate 58 which is designed to feed the corn, which has been snapped by the rollers, and fed onto the plate 57 to the elevating conveyer 59 which passes around the roller 60 at the upper end of the conveyer frame 61, and also around the roller 62 at the lower end of the conveyer frame. This roller 62 is also supported by means of the bracket 63, which bracket supports the lower end of the conveyer frame 61. The roller 62 also has mounted on that end of it which is adjacent to the traction wheel 10 and between said traction wheel and the bracket 63 a gear 64, which gear is in mesh with the gear 65 on the driving shaft 25, so that as the driving shaft 25 is operated, the elevating conveyer will be driven and will cause the ears of corn delivered onto it from the snapping rollers over the inclined plate 57 and the pivoted plate 58 to be elevated to a point of discharge above the husking rollers to be referred to.

The rear upper end of the conveyer frame 61 is supported by means of the roller supporting brace 19 upon which it rests. At the lower end, above the conveyer and at right angles to the shield 28 I have provided an inclined plate 65ª having a hinged portion 65ᵇ at its lower side. This plate is designed to prevent the snapped corn from falling off the lower end of the conveyer 59, except when it is desired to load the snapped corn into the wagon without husking it. These last results are accomplished by swinging the lower plate 65ᵇ upwardly until it falls upon the plate 65ª. The gear 64 is then removed from the roller 62. This stops the conveyer 59 and allows the snapped corn that falls upon it to pass under the plate 65ª and over the lower end of the conveyer 59 without passing over the husking rollers.

Rotatably mounted between the roller supporting braces 19 and 23 are two pairs of husking rollers, the right pair of husking rollers being designated by the numerals 66 and 67 and the left pair being designated by the numerals 68 and 69. The outside rollers 66 and 69 are springingly maintained to allow the slight movement away from their mating rollers. On the upper ends of the rollers 66 and 67 I have provided two gears 70 and 71 in mesh with each other. On the upper ends of the rollers 68 and 69 I have provided the gears 72 and 73 in mesh with each other.

The gears 71 and 72 are in mesh with each other and are so arranged that as any of the gears 70, 71, 72, and 73 are operated, all of them will be operated and will rotate one of the rollers in each pair of rollers in an opposite direction from its mating roller. In mesh with the gear 70 is a gear 75, and this gear 75 is secured to the upper end of the rotatably mounted shaft 76, said shaft having the bevel gear 77 at its lower end in mesh with the bevel gear 78 on that portion of the driving shaft 25 which is adjacent to the sill 13, so that as the driving shaft is operated, the husking rollers will be driven. One of the husking rollers in each pair has in it two grooves 79 and 80 and a detachable rasping band 81 secured thereto midway between its ends. The other mating roller of each pair has two detachable rasping bands 82 and 83 which operate in the grooves 79 and 80 respectively, and also has a groove 84 in which the rasping band 81 is designed to operate so that as each pair of these rollers are operated, the husks of corn will be severed from the ears by means of the rasping surfaces on these detachable bands as they are operated in conjunction with the rollers. These bands 81, 82 and 83 are detachably connected with the rollers to which they are designed to be used, so that they can be easily removed by the operator and replaced by new ones as soon as they have become worn, and thus avoid the necessity of replacing the entire roller as is customary at the present time when these rasping surfaces have lost their effectiveness.

As soon as the husks have been severed by the husking rollers from the ears, these ears will fall upon the carrier 85, which is driven from the shaft 25 and which carrier conveys these ears to the side delivery elevator 86, which elevator is made in the ordinary way, is secured to the sill 13 by means of the bolt 86ª and to the sill 16 by means of the brace 86ᵇ the outer end of the elevator is supported by means of the rod 87 and is driven by a shaft 39ª which is driven from the shaft 25. The lower end of the carrier of this elevator 86 runs in a horizontal plane a slight distance and then in an elevated manner to the point of discharge as shown in Fig. 10. The carrier 85 and the elevator 86 are driven from the driving shaft 25 by means of chains and gearing.

Pivotally secured to the forward end of the sills 12 and 13 is the ordinary tongue 37ª. Pivotally attached to the side of the sill 12 is the lever 88, which lever is pivotally attached to a bar 89 that is attached at its forward end to the lug 90 on the rear end of the tongue, so that as the upper end of the lever is swung forwardly or rearwardly, the forward end of the frame of the machine; that is, the forward end of the frame of the machine, will be lowered or raised. I have provided a hand operated locking device 91 designed to be engaged by the sector 92 for maintaining the frame in any position in its range of movement.

In practical operation and assuming that the parts are assembled as above described, and that the machine is being drawn over the ground surface by draft animals attached to the tongue, and that the row of corn is being fed between the guide shields 27 and 28 by the toothed chains 31 and 34 to the snapping rollers, where these rollers sever the corn from the stalks, then the corn will fall upon the inclined plate 57, over the pivoted plate 58 and onto the elevating conveyer 59 which delivers the corn with the husks still on, onto the husking rollers where the husks are removed and the ears of corn are allowed to drop onto the carrier 85 by which carrier the ears are advanced, and delivered onto the elevating conveyer 86 which delivers them into a wagon driven at the side of the device, the wagon being advanced at the same rate as this device.

Having thus described my invention, what I claim and desire to secure by Letters Patent of the United States, therefor is:

1. In a device of the class described, a pair of snapping rollers designed to coact with each other, a tapered spiral lower end on each snapping roller, a spiral member encircling each of the rollers for advancing the stalks of corn fed between them, means for springingly maintaining one of the rollers in position relative to the other, a pair of guiding shields mounted above and in front of the snapping rollers, a toothed chain in each shield designed to advance the stalks of corn between the guiding shields, traction wheels for rotating said rollers and said toothed chains in opposite directions, and an inclined plate at one side of the snapping rollers designed to receive the ears of corn snapped by the rollers and permit them to slide over it to a point of discharge.

2. In a device of the class described, a pair of snapping rollers designed to coact with each other, a tapered spiral lower end on each snapping roller, a spiral member encircling each of the rollers for advancing the stalks of corn fed between them, means for springingly maintaining one of the rollers in position relative to the other, a pair of guiding shields mounted above and in front of the snapping rollers, a toothed chain in each shield designed to advance the stalks of corn between the guiding shields, traction wheels for rotating said rollers and said toothed chains in opposite directions, an inclined plate at one side of the snapping rollers designed to receive the ears of corn snapped by the rollers and permit them to slide over it to a point of discharge, and a conveyer to receive the ears of corn from the inclined plate and designed to deliver the corn thus received at its upper rear end.

3. In a device of the class described, a pair of snapping rollers designed to coact with each other, a tapered spiral lower end on each snapping roller, a spiral member encircling each of the rollers for advancing the stalks of corn fed between them, means for springingly maintaining one of the rollers in position relative to the other, a pair of guiding shields mounted above and in front of the snapping rollers, a toothed chain in each shield designed to advance the stalks of corn between the guiding shields, traction wheels for rotating said rollers and said toothed chains in opposite directions, an inclined plate at one side of the snapping rollers designed to receive the ears of corn snapped by the rollers and permit them to slide over it to a point of discharge, a conveyer to receive the ears of corn from the inclined plate and designed to deliver the corn thus received at its upper rear end, and a pivoted plate secured to the central portion of the inclined plate and designed to rest upon said conveyer.

4. In a device of the class described, a pair of snapping rollers designed to coact with each other, a tapered spiral lower end on each snapping roller, a spiral member encircling each of the rollers for advancing the stalks of corn fed between them, means for springingly maintaining one of the rollers in position relative to the other, a pair of guiding shields mounted above and in front of the snapping rollers, a toothed chain in each shield designed to advance the stalks of corn between the guiding shields, traction wheels for rotating said rollers and said toothed chains in opposite directions, an inclined plate at one side of the snapping rollers designed to receive the ears of corn snapped by the rollers and permit them to slide over it to a point of discharge, a conveyer to receive the ears of corn from the inclined plate and designed to deliver the corn thus received at its upper rear end, and two pairs of husking rollers mounted partially beneath and behind the delivery end of said conveyer for husking the ears of corn delivered upon it.

5. In a device of the class described, a pair of snapping rollers designed to coact with each other, a tapered spiral lower end on each snapping roller, a spiral member encircling each of the rollers for advancing the stalks of corn fed between them, means for springingly maintaining one of the rollers in position relative to the other, a pair of guiding shields mounted above and in front of the snapping rollers, a toothed chain in each shield designed to advance the stalks of corn between the guiding shields, traction wheels for rotating said rollers and said toothed chains in opposite directions, an inclined plate at one side of the snapping rollers designed to receive the ears of corn snapped by the rollers and permit them to slide over it to a point of discharge, a conveyer to receive the ears of corn from the inclined plate and designed to deliver the corn thus received at its upper rear end, a pivoted plate secured to the central portion of the inclined plate and designed to rest upon said conveyer, and two pairs of husking rollers mounted partially beneath and behind the delivery end of said conveyer for husking the ears of corn delivered upon it.

6. In a device of the class described, a pair of snapping rollers designed to coact with each other, a tapered spiral lower end on each snapping roller, a spiral member encircling each of the rollers for advancing the stalks of corn fed between them, means for springingly maintaining one of the rollers in position relative to the other, a pair of guiding shields mounted above and in front of the snapping rollers, a toothed chain in each shield designed to advance the stalks of corn between the guiding shields, traction wheels for rotating said rollers and said toothed chains in opposite directions, an inclined plate at one side of the snapping rollers designed to receive the ears of corn snapped by the rollers and permit them to slide over it to a point of discharge, a conveyer to receive the ears of corn from the inclined plate and designed to deliver the corn thus received at its upper rear end, two pairs of husking rollers mounted partially beneath and behind the delivery end of said conveyer for husking the ears of corn delivered upon it, a carrier to advance the ears of corn from the husking rollers to a point of discharge, and a side delivery conveyer to receive the corn from said carrier and deliver it to a point of discharge at a point outside of one of the traction wheels.

7. In a device of the class described, a pair of snapping rollers designed to coact with each other, a tapered spiral lower end on each snapping roller, a spiral member encircling each of the rollers for advancing the stalks of corn fed between them, means for springingly maintaining one of the rollers in position relative to the other, a pair of guiding shields mounted above and in front of the snapping rollers, a toothed chain in each shield designed to advance the stalks of corn between the guiding shields, traction wheels for rotating said rollers and said toothed chains in opposite directions, an inclined plate at one side of the snapping rollers designed to receive the ears of corn snapped by the rollers and permit them to slide over it to a point of discharge, a conveyer to receive the ears of corn from the inclined plate and designed to deliver the corn thus received at its upper rear end, a pivoted plate secured to the central portion of the inclined plate and designed to rest upon said conveyer, two pairs of husking rollers mounted partially beneath and behind the delivery end of said conveyer for husking the ears of corn delivered upon it, a carrier to advance the ears of corn from the snapping rollers to a point of discharge, and a side delivery conveyer to receive the corn from said carrier and deliver it to a point of discharge at a point outside of one of the traction wheels.

CHARLES E. TRENT.

Witnesses:
   GEO. A. CRANE,
   HUGH RODDAN.